Jan. 14, 1941.     A. A. SCARLETT     2,228,734
HARROW PLOW
Filed June 14, 1938     3 Sheets-Sheet 1

Inventor
Arthur A. Scarlett

Jan. 14, 1941.  A. A. SCARLETT  2,228,734
HARROW PLOW
Filed June 14, 1938    3 Sheets-Sheet 3

Inventor
Arthur A. Scarlett
By V. F. Lassagne
Atty.

Patented Jan. 14, 1941

2,228,734

UNITED STATES PATENT OFFICE 2,228,734

HARROW PLOW

Arthur A. Scarlett, Hamilton, Ontario, Canada, assignor, by mesne assignments, to International Harvester Company, Chicago, Ill., a corporation of New Jersey Application June 14, 1938, Serial No. 213,636

6 Claims. (Cl. 97—72)

This invention relates to a harrow plow. More specifically it relates to regulating mechanism for the land wheel and rear furrow wheel of a harrow plow.

Ordinarily, the land wheel of a plow is mounted on a crank arm which is adapted to swing down upon actuation of the power lift as the plow shares are lifted out of the ground. The crank arm is subjected to a considerable strain of bending and twisting, and must be made large to withstand such strain. Normally, the rear furrow wheel, which is adjacent the land wheel, is either separately adjustable for depth from the land wheel or adjustable with the land wheel, but there has heretofore been no construction which permitted both a joint depth adjustment of land wheel and rear furrow wheel as well as a separate depth adjustment of the rear furrow wheel.

An object of the present invention is to provide a plow from which the disadvantages of a crank arm mounting for a land wheel have been eliminated.

A further object is the provision of a yoke mounting for the land wheel in a plow.

Another object is to provide a plow in which the land wheel and rear furrow wheel are jointly adjustable for depth and the rear furrow wheel is also separately adjustable.

Still another object of the invention is to provide a plow with a yoke mounting for the land wheel, with joint adjustment for depth of the land wheel and the rear furrow wheel, and with separate adjustment for depth of the rear furrow wheel.

According to the present invention, a yoke is pivotally supported on the longitudinally extending truck frame at the rear end of a plow beam. A land wheel with its axle and power lift mechanism are carried by the yoke. A rear furrow wheel is also mounted on the frame. The connections between the land wheel and furrow wheel are such that a joint adjustment for depth of the land wheel and rear furrow wheel is obtained as well as a separate adjustment for depth of the furrow wheel.

Figure 1:
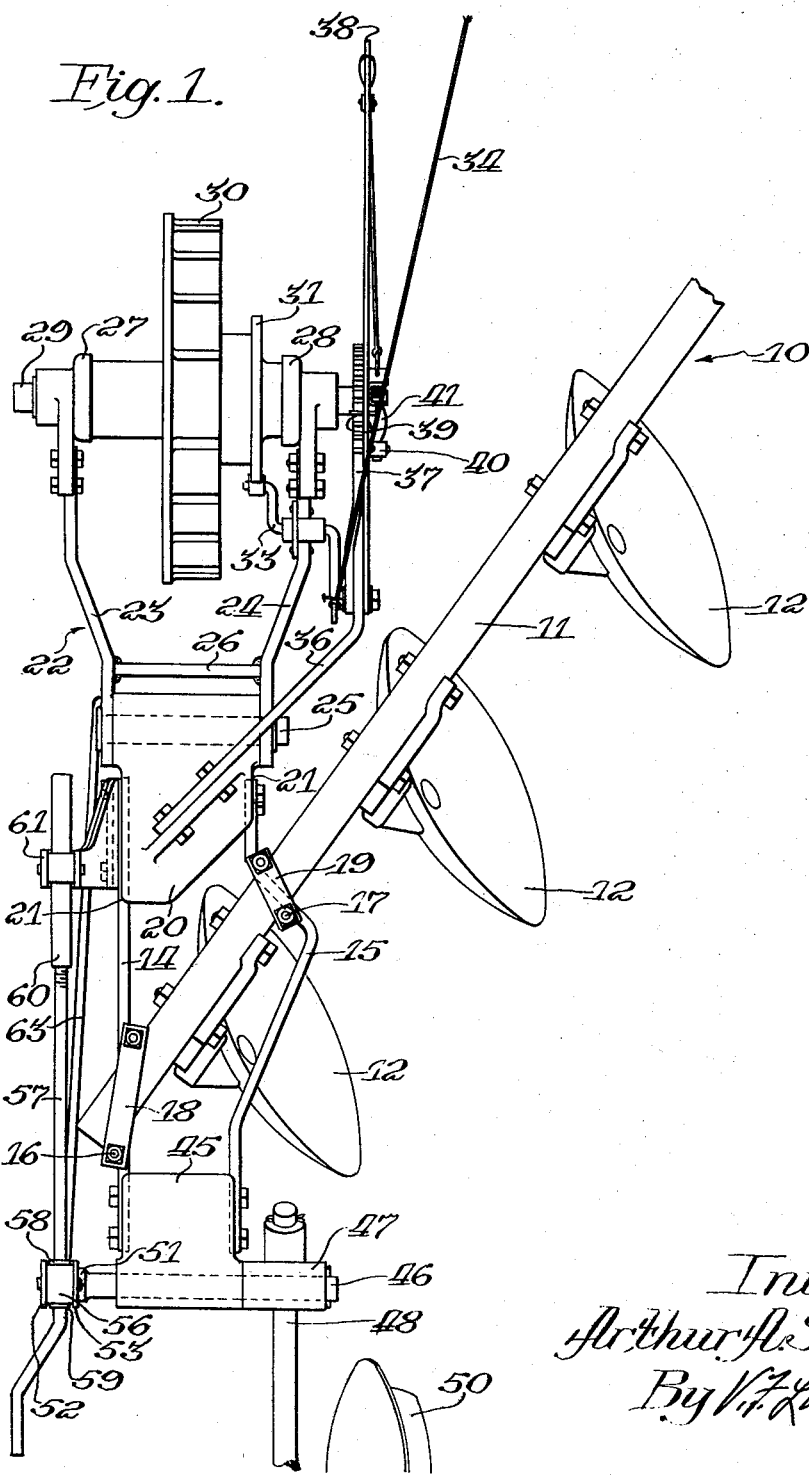
Figure 1 is a plan view of the rear end of a harrow plow.
Figure 2:
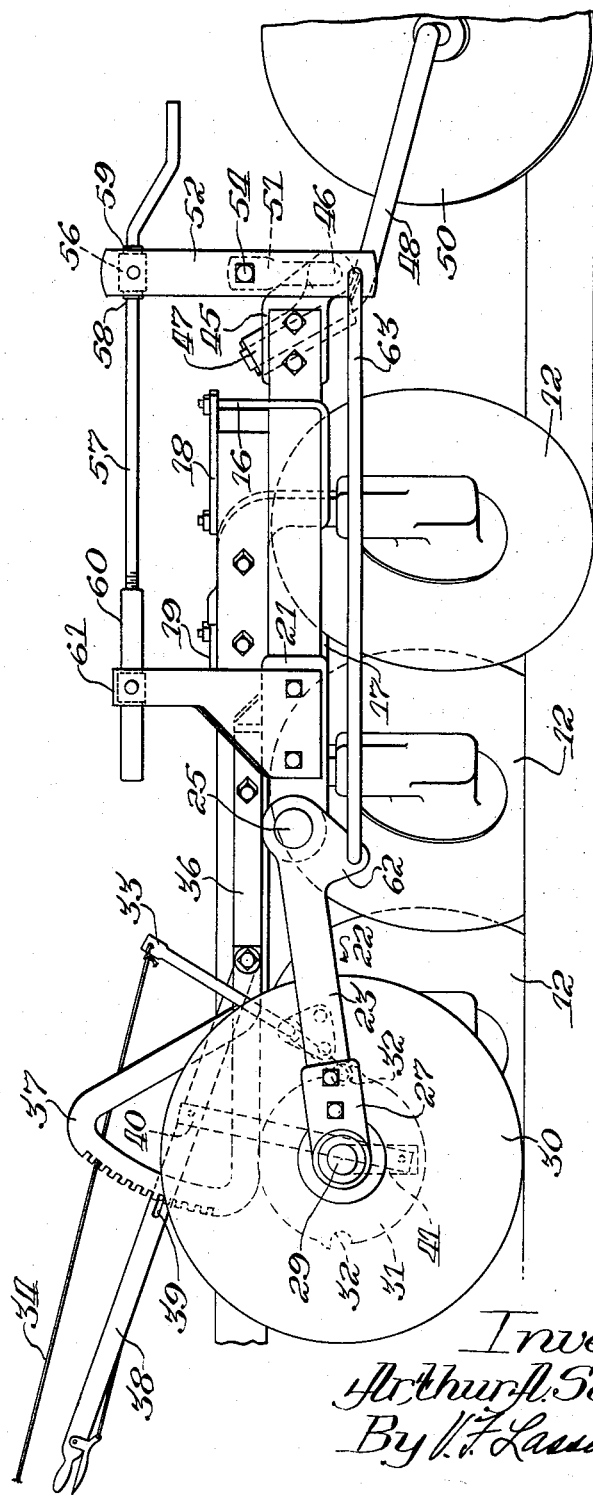
Figure 2 is a side view with the plow in working position.
Figure 3:
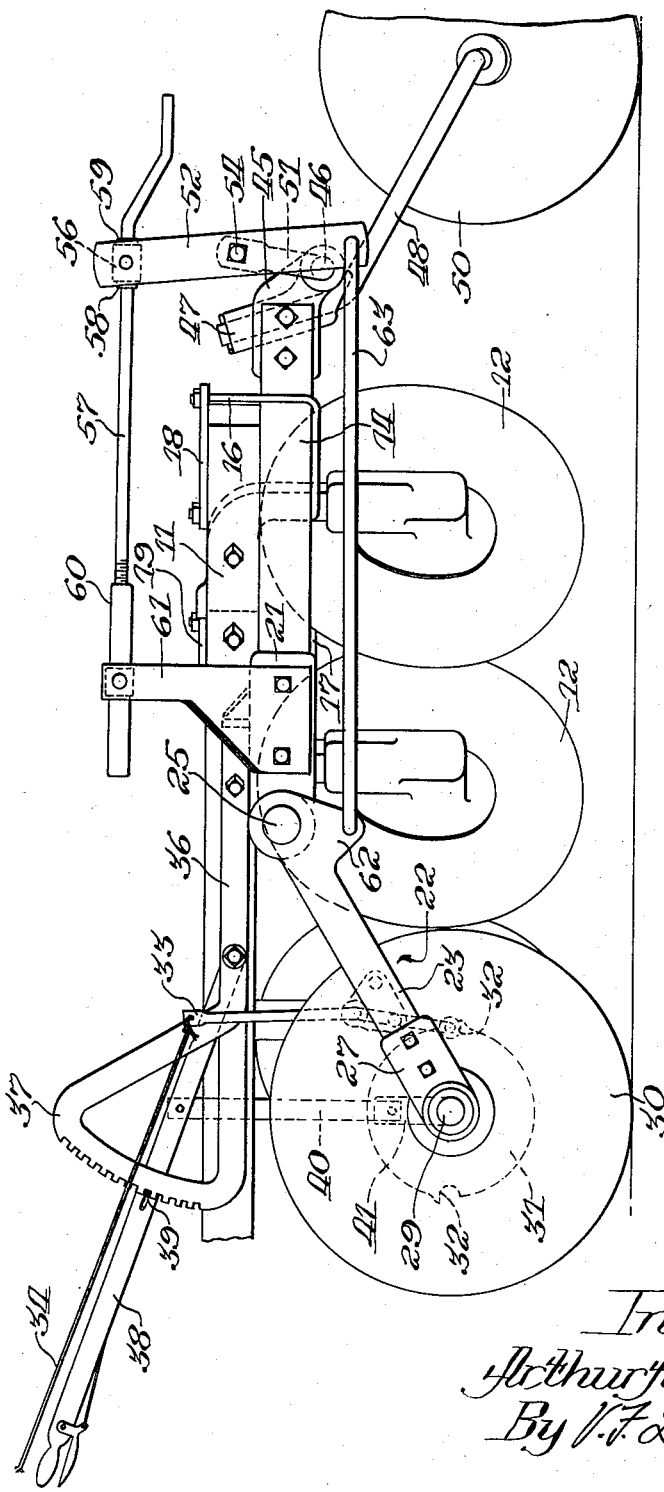
Figure 3 is a side view of the plow of Figure 1 in raised position.

A plow 10, only the rear end of which is shown, has a plow beam 11 carrying harrow plow elements 12 and extending forwardly and laterally. A pair of spaced beams 14 and 15 are fixed to the underside of the plow beam 11 by U-bolts 16 and 17 and straps 18 and 19 across the ends of the U-bolts. A casting 20 is carried between the beams 14 and 15, as at 21, on the forward side of and spaced from the plow beam 11. A yoke 22 is composed of a pair of side members 23 and 24 in the form of bell cranks, a shaft 25 joining the two side members and journaled in the casting 20, a stiffening cross brace 26, and journal members 27 and 28 attached to the ends of the side members 23 and 24. A shaft 29 is carried by the journal members and itself carries rotatably a land wheel 30 and has fixed thereto an intermittently rotating member 31 having notches 32 of typical power lift construction, such as shown in Patent No. 1,440,924, to Lindgren, dated January 2, 1923. A lever 33 is pivotally attached to the side member 24, one end of the lever being adapted to engage the periphery of the plate 31 in the notches 32. A control cord 34 is attached to the other end of the lever.

A bent member 36 is bolted at one end to the casting 20 and has its other end bent back upon itself to form an arcuate toothed portion 37. A control lever 38 is pivotally mounted on the member 36 and has detent 39 engageable with the toothed portion 37. A link 40 is pivotally attached at one end to the lever 38 and at the other end to a crank 41 fixed to the end of the shaft 29.

Between the rear ends of the beams 14 and 15, a casting 45 is bolted. A shaft 46 is journaled in the casting and has fixed at one end a casting 47 in which a crank arm 48 is carried, which in turn carries a rear furrow wheel 50. The opposite end of the shaft 46 is bent in the form of a crank arm 51, which has pivotally attached thereto members 52 and 53 at 54. Between the upper ends of the members 52 and 53, a trunnion member 56 is carried. An adjusting rod 57 is rotatably supported in the trunnion member, being fixed against longitudinal movement by set collars 58 and 59. One end of the rod 57 is threaded into a sleeve 60 carried by a bracket member 61 bolted to the casting 20. A link 63 is pivotally attached at one end to the lower end of the member 52 and at the other end to the side member 23 of the yoke 22.

For depth adjustment of the land wheel 30, the lever 38 is moved up or down, the detent 39 being engaged in the proper notch of the tooth portion 37. The movement of the yoke 22 when the land wheel is adjusted effects a depth adjustment of the rear furrow wheel 50, there being longitudinal movement of the link 63, a swinging of the lever 52 about the trunnion 56 and angular movement of the crank arm end 51 of the shaft 46, the casting 47 and the crank arm 48.

For separate depth adjustment of the rear furrow wheel 50, the rod 57 is turned and moves longitudinally with respect to the sleeve 60, in which it is threaded. There is consequently a swinging of the member 52 about its point of connection with the link 62, as well as angular movement of the crank arm end 51 of the shaft 46, the casting 47 and the crank arm 48 supporting the rear furrow wheel 50.

Lifting of the plow from working position to transport position is effected in the usual manner. A pull on the cord 34 causes disengagement of the end of the lever 33 from notches 32 in the member 31. The land wheel 30 clutches the plate 31 and causes the shaft 29 and the crank arm 41 to rotate. The link 40 is moved up because of rotation of the crank arm 41, and the plow beam 11 is also moved up, carrying the plow elements 12 out of the ground. The angular movement of the yoke 22, on lifting, causes the rear furrow wheel 50 to move down with respect to the plow beam, as described in the preceding paragraph in connection with depth adjustment.

From the foregoing description, it will be apparent that a novel form of plow construction has been provided. By use of a yoke for supporting the land wheel and its shaft, the strains because of twisting and bending normally incident to the use of a crank arm support for the land wheel are eliminated. By the particular system of connection between the rear furrow wheel and the land wheel, both of these wheels may be simultaneously adjusted for depth, and the rear furrow wheel may be separately adjusted.

It will be apparent that the invention is applicable to other types of plows beside the harrow plow.

The intention is to limit the invention only within the scope of the appended claims.

What is claimed is:

1. In a harrow plow, a plow beam extending laterally, a rear truck frame for supporting one end of said beam including a first lever pivotally mounted thereon, a rear furrow wheel carried by the first lever for swinging movement about the truck frame, a second lever pivotally mounted on the frame, and a land wheel carried by the second lever for swinging movement about the frame, a linkage connecting the first and second levers, a first means for swinging the levers simultaneously about the frames with consequent adjustment of the wheels with respect to the frame, and a second independent means for manually swinging the first lever alone with consequent adjustment of the rear furrow alone with respect to the frame.

2. A ground working implement including a frame, a first lever pivotally mounted between its ends to the frame, a first wheel connected to one end thereof, a second lever pivoted intermediate its ends to the other end of the first lever, an adjusting means connecting one end of the second lever with the frame for swinging the first lever about the frame with consequent movement of the first wheel with respect to the frame, a third lever pivoted on the frame and supporting a second wheel at a point spaced therefrom, a link connecting the third lever and the end of the second lever opposite that which the adjusting means connects with the frame, and means for swinging the first and third levers about the frame with consequent movement of the wheels with respect to the frame.

3. A harrow plow comprising a frame, a yoke pivotally mounted thereon, a land wheel carried by the yoke, a shaft rotatably mounted on the frame and having a pair of crank arms extending in different directions, a furrow wheel mounted on one arm, a lever pivoted intermediate its ends to the other crank arm, a link connecting one end of the lever and the yoke, a first adjusting means connecting the opposite end of the lever and the frame for swinging only the shaft and furrow wheel about the frame, and a second independent adjusting means connecting the yoke and the frame for swinging the yoke and its land wheel and for rotating the shaft with consequent swinging of the furrow wheel about the frame.

4. A harrow plow including a frame, a bell crank pivotally mounted thereon and having two arms, a land wheel carried at one end thereof, a shaft having a pair of crank arms thereon mounted on the frame, a furrow wheel carried by one crank arm, means linking the other crank arm and an arm of the bell crank pivoted on the frame, means connecting the last mentioned crank arm and the frame for swinging the furrow wheel about the frame, and means connecting the bell crank and the frame for swinging both the land wheel and the furrow wheel about the frame.

5. In a plow construction, a plow beam extending laterally and having plow elements connected thereto, a longitudinally extending truck structure for supporting one end of said beam and including a wheel, a pivoted yoke means for connecting the wheel to the truck frame and including a shaft extending therethrough on which the wheel is journaled, and means for swinging the yoke, shaft and wheel with respect to the frame.

6. In a harrow plow construction, a plow beam extending forwardly and laterally and harrow plow elements connected thereto, a substantially longitudinally extending truck structure for supporting the rear end of said beam and including a land wheel, a pivoted yoke means for connecting the land wheel to the truck frame and including a shaft extending laterally therethrough on which the land wheel is journaled, and means for adjustably swinging the yoke, shaft and land wheel with respect to the truck frame.

ARTHUR A. SCARLETT.